United States Patent [19]
Luling

[11] Patent Number: 5,241,273
[45] Date of Patent: Aug. 31, 1993

[54] METHOD FOR CONTROLLING DIRECTIONAL DRILLING IN RESPONSE TO HORNS DETECTED BY ELECTROMAGNETIC ENERGY PROPAGATION RESISTIVITY MEASUREMENTS

[75] Inventor: Martin Luling, Missouri City, Tex.

[73] Assignee: Schlumberger Technology Corporation, Houston, Tex.

[21] Appl. No.: 719,798

[22] Filed: Jun. 24, 1991

[51] Int. Cl.$^5$ .......... E21B 7/06; E21B 49/00; G01V 3/30; G01V 3/34

[52] U.S. Cl. .......... 324/338; 175/50; 175/61; 324/369

[58] Field of Search .......... 324/338, 339, 343, 356, 324/366, 369; 175/26, 50, 61

[56] References Cited

U.S. PATENT DOCUMENTS

| | | | |
|---|---|---|---|
| 4,786,874 | 11/1988 | Grosso et al. | 324/369 |
| 4,899,112 | 2/1990 | Clark et al. | 324/338 |
| 5,045,795 | 9/1991 | Gianzero et al. | 324/342 |

OTHER PUBLICATIONS

Advertisement of Teleco Oilfield Services Inc. (one sheet) entitled "Teleco MWD Gives You The In's And Out's Of Horizontal Drilling", 1990.

Anderson, B. et al., "Effects of Dipping Beds on the Response of Induction Tools", SPE 61st Annual Technical Conference, New Orleans, La., Paper SPE 15488 (Oct. 5-8, 1986).

Barber, T. D., and Howard, A. Q., "Correcting the Induction Log for Dip Effect", SPE 64th Annual Technical Conference, San Antonio, Tex., Paper SPE 19607, (Oct. 8-11, 1989).

Howard, A. Q., and Chew, W. C., "A Variational Model of Induction Logging in a Dipping Bed Environment", presented at the IGARSS Symposium, Vancouver, Session F8, Paper 5, (Jul. 10-14, 1989).

Anderson, B. et al., "Response of 2-MHz LWD Resistivity and Wireline Induction Tools in Dipping Beds and Laminated Formations", SPWLA 31st Annual Logging Symposium, Lafayette, La., (Jun. 24-27, 1990).

Wu, J. Q. et al, "Bed Boundary Detection Using Resistivity Sensor in Drilling Horizontal Wells", SPWLA 32nd Annual Logging Symposium (Jun. 16-19, 1991).

Primary Examiner—Gerard R. Strecker
Attorney, Agent, or Firm—Martin M. Novack; Wayne I. Kanak; John J. Ryberg

[57] ABSTRACT

The disclosed method is applicable for use in conjunction with an earth borehole drilling apparatus that typically includes: a drilling rig; and a drill string operating from said drilling rig for drilling an earth borehole, the drill string including a bottom hole arrangement comprising a drill bit and a downhole resistivity measuring subsystem for measuring downhole formation resistivity near the bit by propagating electromagnetic energy into earth formations near the bit, receiving electromagnetic energy that has propagated through the formations and producing measurement signals that depend on the received signals. A method is set forth for directing the drilling of a well bore with respect to a geological bed boundary in the earth formations, including the steps of: producing from the measurement signals a recording of downhole formation resistivity as a function of position; determining the presence of a horn in the resistivity recording; and implementing a change in the drilling direction of the drill bit in response to said determination of the presence of a horn.

12 Claims, 6 Drawing Sheets

METHOD FOR CONTROLLING DIRECTIONAL DRILLING IN RESPONSE TO HORNS DETECTED BY ELECTROMAGNETIC ENERGY PROPAGATION RESISTIVITY MEASUREMENTS

FIELD OF THE INVENTION

This invention relates to the field of earth borehole drilling and, more particularly, to a method for controlling directional drilling.

BACKGROUND OF THE INVENTION

Directional drilling involves the drilling of a well bore along a deviated course in order to bottom out in a target region at a particular vertical and horizontal distance from the original surface location. Directional drilling is employed, for example, to obtain an appropriate well bore trajectory into an oil producing formation bed (or "pay zone") and then drill substantially within the pay zone. A horizontally drilled well can greatly increase the borehole volume in the pay zone with attendant increase in oil production. Recent advances in directional drilling equipment and techniques, some of which are referenced hereinbelow, have greatly improved the efficiency of certain drilling operations.

Before a directional drilling well plan is devised, the drilling team will usually have significant a priori knowledge of geological attributes of the local formations. This knowledge may be derived, for example, from survey and/or producing wells in the local area. Accordingly, in the directional drilling process, expected formation bed boundaries may be sought as markers from which to implement trajectory changes in the well bore. These boundaries are typically determined using borehole logging equipment; e.g. with so-called "wireline" logging equipment, wherein measurements are taken in a well bore (with the drill string removed) by lowering one or more logging devices in the well bore on a cable and taking measurements with the device(s) as the cable is withdrawn, and/or with so-called "logging-while-drilling" equipment wherein one or more logging devices are mounted on the drill string near the bit. Logging-while-drilling has obvious advantages for directional drilling in that trajectory changes, made in response to logging information, can be implemented without pulling the drill string.

Resistivity logging, which measures the electrical resistivity of formations surrounding an earth borehole, is a commonly used technique of formation evaluation. In so-called propagation logging, which is well suited to logging-while-drilling, energy is transmitted into the formations and propagates therein. Energy shed back into the borehole is measured at a receiver pair, in a so-called differential receiver arrangement, to obtain a phase shift measurement and an attenuation measurement. In one exemplary form of propagation logging, these measurements are sent to the surface of the earth where means are provided for determining, as a function of the phase shift, the resistivity ($R_{ps}$) of formations at a relatively shallow depth of investigation around the receivers, and for determining, as a function of the attenuation, the resistivity ($R_a$) of formations at a relatively deep depth of investigation around the receivers. Reference can be made to U.S. Pat. No. 4,899,112 for further description of equipment which utilizes propagating electromagnetic energy to obtain $R_{ps}$ and $R_a$.

The resistivity logging values obtained from the described type of propagation logging device are useful in determining formation resistivity at two depths of investigation, and can also be used to locate bed boundaries under most conditions, such as by observing crossovers between $R_{ps}$ and $R_a$. However, when there is substantial invasion of the formations by the drilling fluid, bed boundary delineation can suffer. Also, there are situations which arise in directional drilling, particularly horizontal drilling, when improved bed boundary delineation may be desirable or necessary. Consider, for example, the situation where horizontal drilling has been initiated in a pay zone and it is desired to maintain a course in the pay zone and adjacent a boundary to the pay zone. As the drill path approaches the boundary at a very small angle (e.g., almost parallel to the boundary, which is a dip angle close to 90 degrees) it would be advantageous to know the boundary has been approached or reached as soon as possible (in terms of either time or position), and to be able to identify the location of the boundary with good accuracy. In such circumstance, prior boundary determination techniques may be inadequate, and the directional drilling operation can lose efficiency as steering corrections are missed or made at the wrong position, in the wrong direction, or later than they should be.

It is among the objects of the present invention to provide an improved method for directing or maintaining the drilling of a well bore with respect to formation bed boundaries.

SUMMARY OF THE INVENTION

It is known that under certain conditions the resistivity measurements obtained with logging equipment, such as induction logging devices, exhibit horns at formation geological bed boundaries. [See, for example, T. D. Barber & A. Q. Howard, "Correcting the Induction Log for Dip Effect", SPE 64th Annual Technical Conference, San Antonio (Oct. 1989), Paper SPE 19607; A. Q. Howard & W. C. Chew, "A Variational Model of Induction Logging in a Dipping Bed Environment", IGARSS Symposium, Vancouver (Jul. 10-14, 1989), Session F8, Paper 5. ] The horns, which occur in electromagnetic logging tools as well as induction tools, are caused by polarizations at the boundaries. In the prior art, such as in induction logging, horns are considered an unfortunate anomaly, and substantial effort has been expended to eliminate horns, for example by applying appropriate post-processing.

Instead of attempting to eliminate horns in the resistivity response of an electromagnetic propagation resistivity logging device, Applicant utilizes the horns to advantage in the steering of directional drilling apparatus with respect to a formation bed boundary. [As used herein a "horn" in the resistivity signal or recording, as a function of position, means a sharp local maximum with a peak resistivity at least twice the resistivity on either side of the local maximum.] Applicant has determined that substantial horns generally do not occur for dip angles less than about 45 degrees. The horn magnitude then increases with increasing dip angle. Therefore, in situations where the drilled well bore is approaching a bed boundary at a large dip angle, or where it is desirable to maintain the well bore adjacent (approximately parallel) to a bed boundary plane, the horns can be used to advantage in steering the drill bit to obtain or maintain a course that will be within the formation zone of interest.

A form of the present invention is applicable for use in conjunction with an earth borehole drilling apparatus that typically includes: a drilling rig; and a drill string operating from said drilling rig for drilling an earth borehole, the drill string including a bottom hole arrangement comprising a drill bit and a downhole resistivity measuring subsystem for measuring downhole formation resistivity near the bit by propagating electromagnetic energy into earth formations near the bit, receiving electromagnetic energy that has propagated through the formations and producing measurement signals that depend on the received signals. [As used herein, "near the drill bit" means within a distance of several drill collar lengths from the drill bit.] A method is set forth for directing the drilling of a well bore with respect to a geological bed boundary in the earth formations, comprising the steps of: producing from the measurement signals a recording of downhole formation resistivity as a function of position; determining the presence of a horn in the resistivity recording; and implementing a change in the drilling direction of the drill bit in response to said determination of the presence of a horn. In the preferred embodiment of the invention, the producing of measurement signals includes producing signals that depend on the phase shift of the propagating electromagnetic energy, and said step of producing a recording of downhole resistivity comprises producing a recording of resistivity as a function of the phase shift measurement signals.

Further features and advantages of the invention will become more readily apparent from the following detailed description when taken in conjunction with the accompanying drawings.

DETAILED DESCRIPTION

Figure 1:
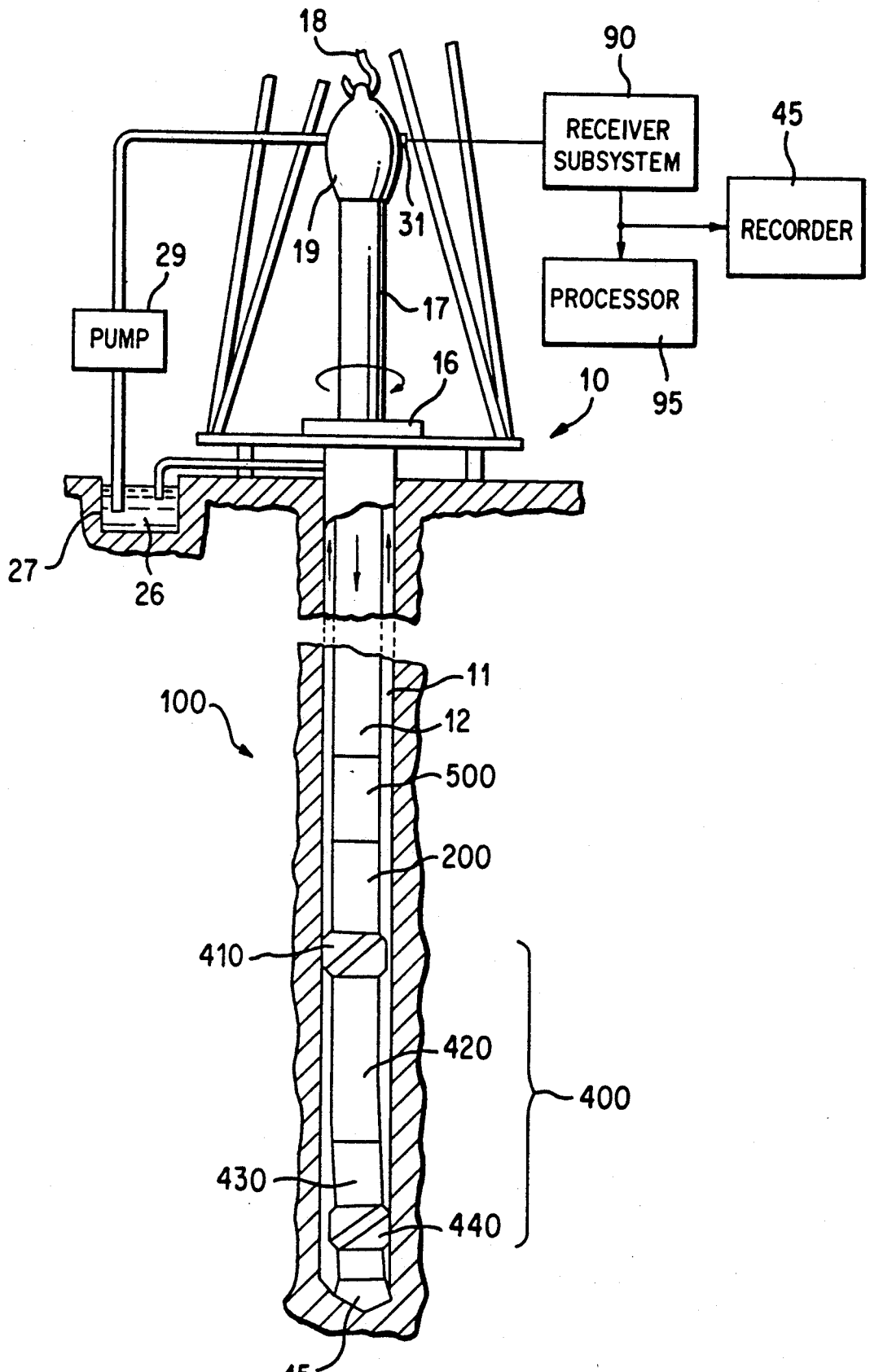
FIG. 1 is a diagram, partially in block form, of an apparatus that can be utilized in practicing an embodiment of the invented method.

Referring to FIG. 1, there is illustrated an apparatus which can be utilized in practicing an embodiment of the invented method. A platform and derrick 10 are positioned over a borehole 11 that is formed in the earth by rotary drilling. A drill string 12 is suspended within the borehole and includes a drill bit 15 at its lower end. The drill string 12, and the drill bit 15 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string 12 and drill bit 15 may be rotated from surface by a "top drive" type of drilling rig. Drilling fluid or mud 26 is contained in a pit 27 in the earth. A pump 29 pumps the drilling fluid into the drill string via a port in the swivel 19 to flow downward through the center of drill string 12. The drilling fluid exits the drill string via ports in the drill bit 15 and then circulates upward in the region between the outside of the drill string and the periphery of the borehole. As is well known, the drilling fluid thereby lubricates the bit and carries formation cuttings to the surface of the earth. The drilling fluid is returned to the pit 27 for recirculation.

Mounted in conjunction with the drill bit 15 is a bottom hole assembly 100. In the apparatus of FIG. 1 a directional drilling subassembly 400, of known type, is employed in the bottom hole assembly and includes a stabilizer 410, an offset (or "bent") sub 420, a mud motor 430 that is driven by the flowing mud, and a near-bit stabilizer 440. The mud motor 430 and bent sub 420 can alternatively be combined in a mud motor unit having a bent housing, with the motor drive in the upper portion of the housing and bearings in the bottom portion of the housing. The bent sub or bent housing typically has an offset or bend angle of $\frac{1}{2}$ to 2 degrees. As is known in the art, when the bit is driven by the mud motor only (with the drill string stationary), the bit will deviate in a direction determined by the tool face direction in which the drill string and bent sub are oriented [so-called "sliding mode"]. When it is desired to drill substantially straight, the drill string and the mud motor are both rotated at appropriate rates [so-called "rotating mode"]. In this manner, directional drilling can be implemented with reasonable accuracy and without unduly frequent tripping of the drill string. For further description of this general type of directional drilling apparatus and techniques, reference can be made to T. Brassfield et al., "Drill Faster, More Accurately With New Navigation System", World Oil, Aug. 8, 1985. It will be understood that other equipment and techniques for directional drilling can be employed.

Mounted above the directional drilling subassembly 400 is a formation resistivity measuring apparatus 200 which is described further hereinbelow. A measurement and communications subassembly 500 is also provided and includes means, known in the art, for measuring and/or computing the direction and inclination of the bottom hole assembly, the rotational orientation of the bottom hole assembly ("tool face"), and, typically, other measurements which need not be summarized herein. The communications portion of the subassembly 500 may typically be a mud pulse telemetry system that includes a downhole transmitter for sending coded information, including measurement signals, uphole and surface instrumentation for detecting and decoding the information. One type of transmitter is an acoustic transmitter which employs a device known as a "mud siren" which includes a slotted stator and a slotted rotor that rotates and repeatedly interrupts the flow of drilling fluid to establish a desired acoustic wave signal in the drilling fluid. Driving electronics in subassembly 150 may typically include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 which is operative to demodulate the transmitted signals, which can then be coupled to processor 95 and recorder 45.

Figure 2:
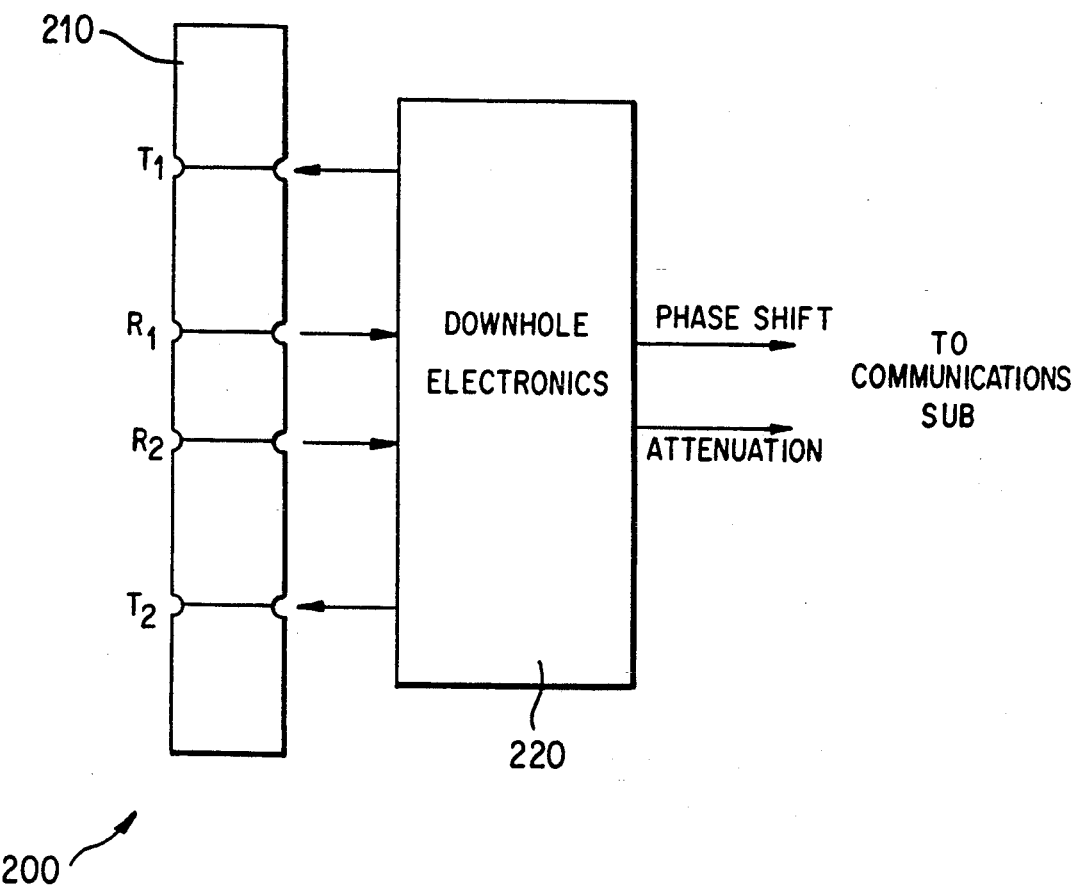
FIG. 2 is a simplified diagram, partially in block form, of the formation resistivity subassembly of the FIG. 1 apparatus.

FIG. 2 is a simplified representation of the formation resistivity measuring subassembly 200 of the FIG. 1 apparatus. This subassembly, known in the art, may be in accordance with apparatus described in the above-referenced U.S. Pat. No. 4,899,112, which is incorporated herein by reference. In a preferred embodiment, the apparatus includes spaced apart transmitting antennas $T_1$ and $T_2$ mounted on a section of drill collar 210, and spaced apart receiving antennas $R_1$ and $R_2$ mounted between the transmitting antennas. The antennas are coils supported in insulating media in recesses in the drill collar. The downhole electronics, typically contained in the drill collar 210 and represented in FIG. 2 by the block 220, include, inter alia, means for alternately energizing the transmitters with a signal having a frequency in the range about 0.1 MHz to 10 MHz, and typically about 2 MHz. Electromagnetic energy is transmitted into the formation and propagates therein. Energy shed back into the borehole is measured at the receiver pair, in a so-called differential receiver arrangement, to obtain a phase shift measurement and an attenuation measurement. These measurements are coupled to the subassembly 500 for transmission to the surface of the earth where means are provided, such as in processor 95, for determining, as a function of the phase shift, the resistivity ($R_{ps}$) of formations at a relatively shallow depth of investigation around the receivers, and for determining, as a function of the attenuation, the resistivity ($R_a$) of formations at a relatively deep depth of investigation around the receivers. If desired, the resistivity values could be determined downhole and transmitted for storage and/or recording uphole, or stored downhole for subsequent derivation uphole. Also, the use of two transmitters provides borehole compensation, but measurements could be obtained using a single transmitter. In the preferred embodiment of the method hereof the resistivity ($R_{ps}$) determined from the phase shift measurement is utilized, although $R_a$ could be used in a less preferred form of the technique.

It is known that under certain conditions the resistivity measurements obtained with logging equipment, such as induction logging devices, exhibit horns at formation geological bed boundaries. [See, for example, the above referenced publications T. D. Barber & A. Q. Howard, "Correcting the Induction Log for Dip Effect", SPE 64th Annual Technical Conference, San Antonio (Oct. 1989), Paper SPE 19607; A. Q. Howard & W. C. Chew, "A Variational Model of Induction Logging in a Dipping Bed Environment", IGARSS Symposium, Vancouver (Jul. 10-14, 1989), Session F8, Paper 5.] The horns are caused by polarizations at the boundaries. The height of a horn depends, inter alia, on the resistivity contrast between adjacent beds. A small resistivity contrast between adjacent beds does not produce a horn. Conversely, a large resistivity contrast can result in large horns. The polarization is caused by a discontinuity of the electric field crossing the bed boundary. In the absence of dip, for both induction logging tools and propagation logging tools, the induced electric fields and their currents are parallel to the bed boundaries. However, when a dipping bed boundary is encountered, the induced currents have to cross the bed boundary. The currents must be the same for a given current loop because the electrons or ions cannot simply vanish. The boundary separates two beds of different resistivity. Thus, to obey Ohm's law the electric field must be different in the two beds. The normal component of the electric field has a discontinuity across the boundary which causes a polarization or charge build-up at the boundary.

The polarization layer oscillates with the same frequency as the originating wave. Thus. the oscillating charge acts like a secondary transmitter. As the receivers move past the boundary, the received signal strength from this secondary transmitter suddenly becomes very strong, and the received signal is distorted into a "polarization-horn". The polarization of the dipped bed boundary depends strongly on the dip angle as well as on the resistivity contrast and the resistivity levels. The magnitude of the polarization is proportional to $$\frac{(R_1 - R_2)^2 \sin^2(\theta_{dip})}{R_1 R_2 (R_1 + R_2)}$$

[A. Q. Howard & W. C. Chew, "A Variational Model of Induction Logging in a Dipping Bed Environment", IGARSS Symposium, Vancouver (Jul. 10-14, 1989), Session F8, Paper 5.] Applicant has found that the vertical response of a propagation logging device at 2 MHz is fairly stable for dip angles up to about 45 degrees. For larger angles, the polarization horn develops. The horns are more prominent for larger resistivity contrasts and are more prominent in conductive than in resistive environments. As a function of true depth, the width of the horn is approximately the same as the receiver spacing between the differential receivers of the propagation resistivity logging device. Further discussion, analysis, and data can be found in Applicant's co-authored publication, "Response Of 2-MHz LWD Resistivity And Wireline Induction Tools In Dipping Beds And Laminated Formations", 31st SPWLA Annual Logging Symposium, Jun. 24-27, 1990.

In the method hereof, the horns are considered not as an unfortunate anomaly to be corrected, but as accurate bed boundary markers for use in steering directional drilling equipment with respect to formation beds. FIGS. 3A, 3B, 4A and 4B illustrate an example of the use of the invented method in a so-called horizontal drilling situation. In the simplified example of FIGS. 3A, 3B, 4A and 4B, a subsurface formation is assumed to have a number of geological bedding planes. For ease of illustration the beds are shown as being horizontal, although it will be understood that the principles hereof will apply regardless of the formation bed orientations. The exemplary formation includes a top formation layer (1) of resistivity 10 ohm-m, a cap shale layer (2) of resistivity 2 ohm-m, a hydrocarbon-containing sand or "pay sand" (3) of resistivity 50 ohm-m, and a bottom wet sand (4) of resistivity 0.2 ohm-m.

Figure 3A:
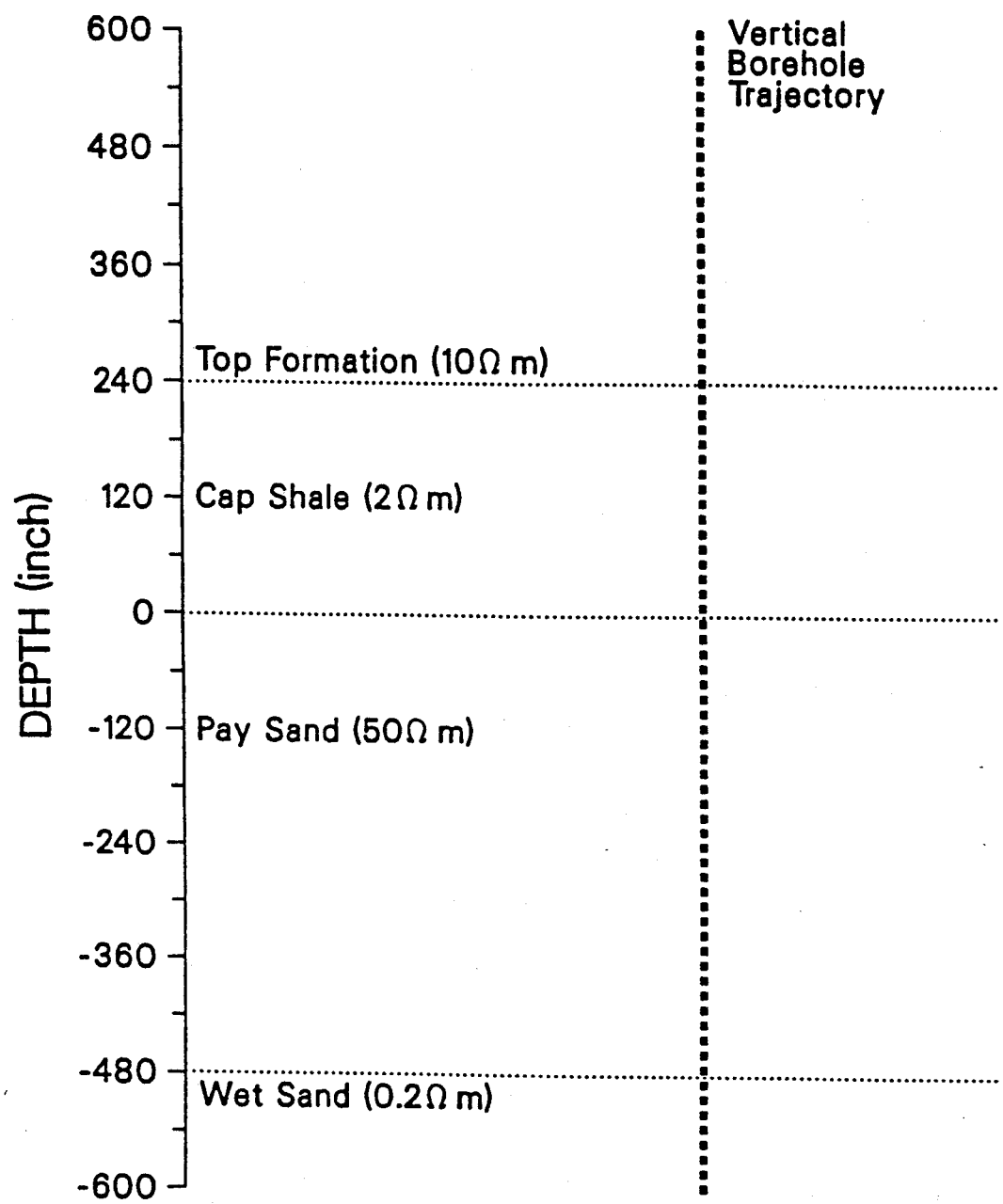
FIGS. 3A and 3B illustrate a vertical well bore trajectory through an exemplary formation, and computed resistivity logs for the indicated trajectory.
Figure 3B:
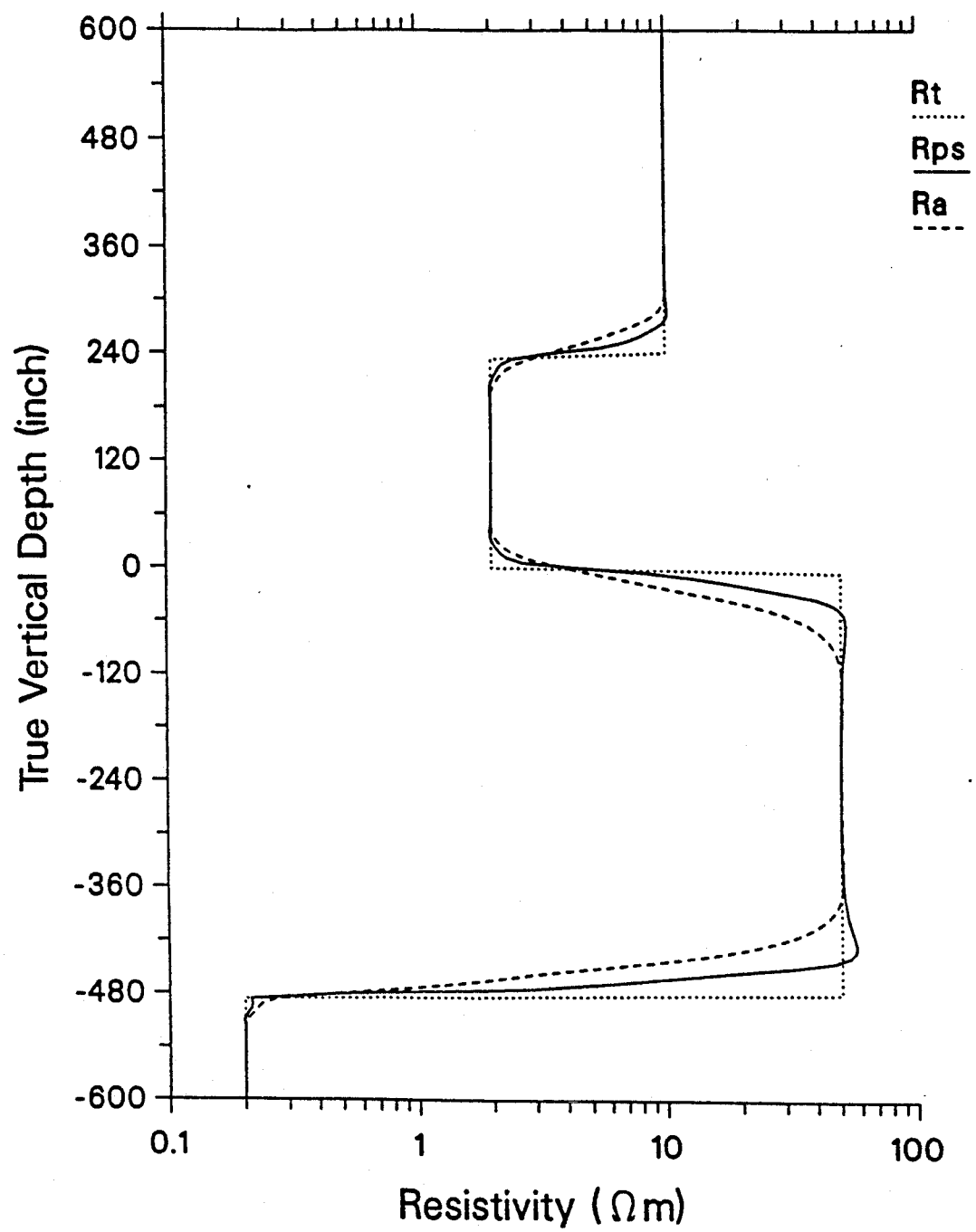
Figure 4A:
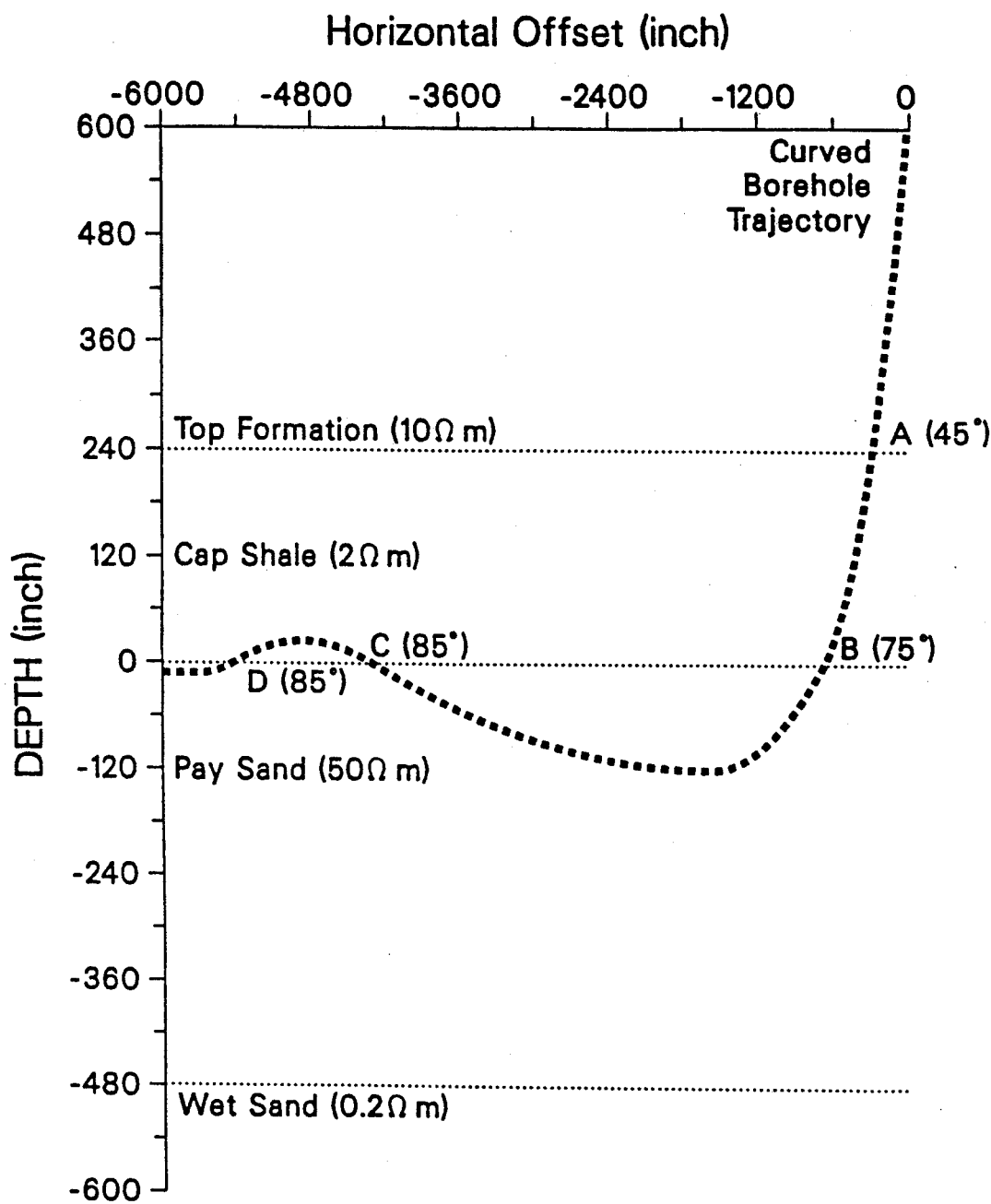
FIGS. 4A and 4B illustrate a curved well bore trajectory through an exemplary formation, and computed resistivity logs for the indicated trajectory.
Figure 4B:
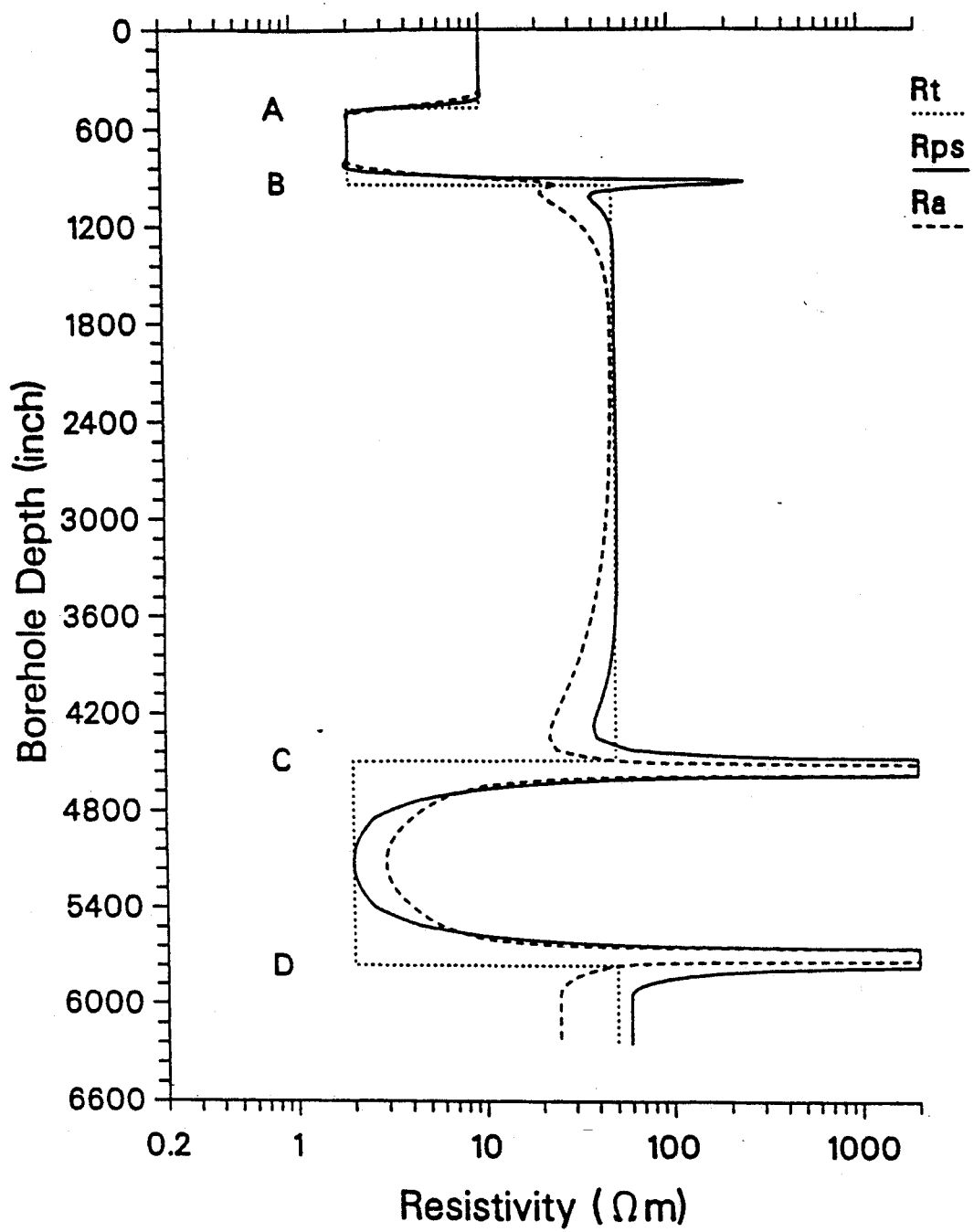

FIGS. 3B and 4B were obtained from computer modeling of the tool characteristic in the exemplary formation. The diagram of FIG. 3A shows a vertical borehole trajectory through the formation. FIG. 3B illustrates the true resistivity ($R_t$, dotted line), the resistivity ($R_{ps}$, solid line) as obtained from the phase shift measured by propagation logging equipment 200, and the resistivity ($R_a$, dashed line) as obtained from the attenuation measured by propagation logging equipment 200. On the depth scale set forth in FIGS. 3A and 3B, the top bed boundary of the pay sand (3) is indicated at a depth z=o, with positive and negative depth values, in terms of true vertical depth, being set forth in inches. Since the trajectory in FIG. 3A is vertical, true depth is the same as borehole depth. No horns are present, as the dip angle is zero degrees. Bed boundaries are generally determinable from cross-overs of $R_{ps}$ and $R_a$, as described in the above-referenced U.S. Pat. No. 4,899,112.

The borehole trajectory of FIG. 4A begins to curve at z=+600 inches and crosses the boundary between beds (1) and (2) [point A] at an angle of 45 degrees in this example. [The trajectory angles in the diagram appear greater than actual since the horizontal offset scale is compressed with respect to the vertical (true depth) scale.] The trajectory continues as shown in FIG. 4A, with points B, C, and D marking the crossing of the boundary between beds (2) and (3), at the indicated angles. FIG. 4B shows $R_t$, $R_{ps}$, and $R_a$ for the FIG. 4A borehole, with resistivity being plotted as a function of borehole depth. The top reference depth in this case is at z=o. At point A, with the dip angle 45 degrees, there are no horns in $R_{ps}$, or $R_t$. At point B (75 degree dip angle) there is a horn in $R_{ps}$, but no horn in $R_a$. At points C and D (85 degree dip angle), there are large horns (which go off the scale) in $R_{ps}$ and $R_a$.

The very prominant and distinct horns at high dip angles, particularly in $R_{ps}$, can be used to particular advantage in directional drilling of a well bore with respect to a boundary (e.g. at point B in FIG. 3A), so as to achieve an appropriate trajectory into a bed, and/or to maintain the well bore in a bed (e.g. a pay zone) adjacent a boundary. The general location of boundaries may be known e.g. from offset wells, other local geological knowledge, or other logging. When the distinct marker of the horn in $R_{ps}$ is detected, steering can be implemented using the system of FIG. 1 to implement appropriate trajectory increments at the bedding plane. The steering change can be implemented, without tripping, in the manner previously described or, for example, after tripping using previously transmitted or stored data.

The invention has been described with reference to a particular preferred embodiment, but variations within the spirit and scope of the invention will occur to those skilled in the art.

I claim:

1. For use in conjunction with an earth borehole drilling apparatus that includes: a drilling rig; a drill string operating from said drilling rig for drilling an earth borehole, said drill string including a bottom hole arrangement comprising a drill bit, a downhole resistivity measuring subsystem for measuring downhole formation resistivity near said bit by propagating electromagnetic energy into earth formations near said bit, receiving electromagnetic energy that has propagated through the formations and producing measurement signals that depend on the received signals; a method for directing the drilling of a well bore with respect to a geological bed boundary in said earth formations, comprising the steps of:

producing from said measurement signals a recording of downhole formation resistivity as a function of borehole depth, determining the presence of a horn in said resistivity recording; and implementing a change in the drilling direction of said drill bit in response to said determination of the presence of a horn.

2. The method as defined by claim 1, wherein said producing of measurement signals includes producing signals that depend on the phase shift of said propagating electromagnetic energy, and wherein said step of producing a recording of downhole resistivity comprises producing a recording of resistivity as a function of said phase shift measurement signals.

3. The method as defined by claim 1, wherein said producing of measurement signals includes producing signals that depend on the attenuation of said propagating electromagnetic energy, and wherein said step of producing a recording of downhole resistivity comprises producing a recording of resistivity as a function of said attenuation measurement signals.

4. The method as defined by claim 1, further comprising the steps of determining the presence of further horns in said resistivity recording, and implementing further steering changes in the drilling direction of said drill bit in response to the presence of respective further horns.

5. The method as defined by claim 2, further comprising the steps of determining the presence of further horns in said resistivity recording, and implementing further changes in the drilling direction of said drill bit in response to the presence of respective further horns.

6. The method as defined by claim 3, further comprising the steps of determining the presence of further horns in said resistivity recording, and implementing further changes in the drilling direction of said drill bit in response to the presence of respective further horns.

7. The method as defined by claim 1, wherein said earth borehole drilling apparatus further includes downhole telemetry means for transmitting the measurement signals uphole, and uphole telemetry means for receiving the measurement signals; and wherein said step of producing from said measurement signals a recording of downhole formation resistivity comprises producing said recording from the measurement signals received via said downhole telemetry means and said uphole telemetry means.

8. The method as defined by claim 2, wherein said earth borehole drilling apparatus further includes downhole telemetry means for transmitting the measurement signals uphole, and uphole telemetry means for receiving the measurement signals; and wherein said step of producing from said measurement signals a recording of downhole formation resistivity comprises producing said recording from the measurement signals received via said downhole telemetry means and said uphole telemetry means.

9. The method as defined by claim 5, wherein said earth borehole drilling apparatus further includes downhole telemetry means for transmitting the measurement signals uphole, and uphole telemetry means for receiving the measurement signals; and wherein said step of producing from said measurement signals a recording of downhole formation resistivity comprises producing said recording from the measurement signals received via said downhole telemetry means and said uphole telemetry means.

10. For use in conjunction with an earth borehole directional drilling apparatus that includes: a drilling rig; a drill string operating from said drilling rig for drilling an earth borehole, said drill string including a bottom hole arrangement comprising a drill bit, a downhole resistivity measuring subsystem for measuring downhole earth formation resistivity near said bit by propagating electromagnetic energy into earth formations near said bit, receiving electromagnetic energy that has propagated through the formations and producing measurement signals that depend on the received signals, and downhole telemetry means for transmitting the measurement signals uphole; and uphole telemetry means for receiving the measurement signals; wherein said apparatus has initiated drilling a well bore within a first geological bed in said formations and approximately adjacent a geological bed boundary between said first bed and a second geological bed in said formations; a method for maintaining drilling of the well bore in said first bed, comprising the steps of:

deriving, from said measurement signals, downhole formation resistivity;

monitoring said resistivity, as a function of the borehole depth of the drill bit position, to detect the presence of horns in said resistivity; and implementing changes in the drilling direction of said drill bit in response to the detection of resistivity horns.

11. The method as defined by claim 10, wherein said producing of measurement signals includes producing signals that depend on the phase shift of said propagating electromagnetic energy, and wherein said step of deriving downhole formation resistivity includes deriving values that depend on said phase shift measurement signals.

12. The method as defined by claim 10, wherein said producing of measurement signals includes producing signals that depend on the attenuation of said propagating electromagnetic energy, and wherein said step of deriving downhole formation resistivity includes deriving values that depend on said attenuation measurement signals.

* * * * *

REEXAMINATION CERTIFICATE (2803rd)

United States Patent [19]
Luling

[11] B1 5,241,273
[45] Certificate Issued Feb. 20, 1996

[54] METHOD FOR CONTROLLING DIRECTIONAL DRILLING IN RESPONSE TO HORNS DETECTED BY ELECTROMAGNETIC ENERGY PROPAGATION RESISTIVITY MEASUREMENTS

[75] Inventor: Martin Luling, Missouri City, Tex.

[73] Assignee: Schlumberger Technology Corporation, Houston, Tex.

Reexamination Request:
No. 90/003,539, Aug. 30, 1994

Reexamination Certificate for:
Patent No.: 5,241,273
Issued: Aug. 31, 1993
Appl. No.: 719,798
Filed: Jun. 24, 1991

[51] Int. Cl.$^6$ .............. E21B 7/06; E21B 49/00; G01V 3/30; G01V 3/34
[52] U.S. Cl. .............. 324/338; 175/50; 175/61; 324/369
[58] Field of Search ............ 324/338, 339

[56] References Cited

U.S. PATENT DOCUMENTS

| | | | |
|---|---|---|---|
| 4,786,874 | 11/1988 | Grosso et al. | 324/369 |
| 4,899,112 | 2/1990 | Clark et al. | 324/338 |
| 5,230,386 | 7/1993 | Wu et al. | |

OTHER PUBLICATIONS

Hansen, et al, "Features of Logging—While Drilling (LWD) in Horizontal Wells", 1991 SPE/IADC Drilling Conference, Amsterdam, Netherlands, paper SPE/IADC 21989 (Mar. 11–13, 1991).

Anderson et al, "Effects of Dipping Beds on the Response of Induction Tools", SPE 15488 paper, Oct. 5–8, 1986.

Gianzero et al., "Induction, Resistivity, and MWD Tools in Horizontal Wells", The Log Analyst, May–Jun., 1990.

Gianzero et al., "Induction, Resistivity and MWD Tools in Horizontal Wells", SPWLA Thirtieth Annual Logging Symposium, Jun. 11–14, 1989.

Anderson et al., "Response of 2-MHz LWD Resistivity and Wireline Induction Tools in Dipping Beds and Laminated Formations", 31st SPWLA Annual Logging Symposium, Jun. 24–27, 1990.

*Primary Examiner*—Gerard R. Strecker

[57] ABSTRACT

The disclosed method is applicable for use in conjunction with an earth borehole drilling apparatus that typically includes: a drilling rig; and a drill string operating from said drilling rig for drilling an earth borehole, the drill string including a bottom hole arrangement comprising a drill bit and a downhole resistivity measuring subsystem for measuring downhole formation resistivity near the bit by propagating electromagnetic energy into earth formation near the bit, receiving electromagnetic energy that has propagated through the formations and producing measurement signals that depend on the received signals. A method is set forth for directing the drilling of a well bore with respect to a geological bed boundary in the earth formations, including the steps of: producing from the measurement signals a recording of downhole formation resitivity as a function of position; determining the presence of a horn in the resistivity recording; and implementing a change in the drilling direction of the drill bit in response to said determination of the presence of a horn.

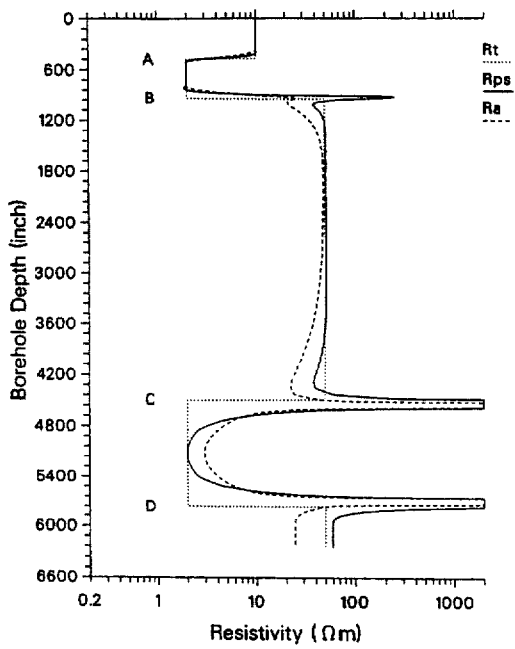

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

\* \* \* \* \*